United States Patent [19]

Anderson et al.

[11] 4,116,140

[45] Sep. 26, 1978

[54] PRESS WHEEL DEPTH CONTROL FOR GRAIN DRILL FURROW OPENERS

[75] Inventors: Joseph A. Anderson; Chester G. Neukom, both of Jamestown, N. Dak.

[73] Assignee: Haybuster Manufacturing, Inc., Jamestown, N. Dak.

[21] Appl. No.: 749,051

[22] Filed: Dec. 9, 1976

[51] Int. Cl.² .............................................. A01C 5/00
[52] U.S. Cl. ...................................... 111/52; 111/85; 172/500; 172/501; 172/572; 172/624
[58] Field of Search .................. 111/77, 85, 81, 52, 111/53, 54, 55, 56, 59, 60, 61, 62, 63, 64, 65, 69, 81, 84, 86; 172/39, 734, 744, 133, 325, 500, 501, 572, 624

[56] References Cited

U.S. PATENT DOCUMENTS

| 655,334 | 8/1900 | Falconer | 111/86 |
| 2,033,366 | 3/1936 | White | 111/59 |
| 2,217,866 | 10/1940 | Hipple | 111/60 |
| 2,496,885 | 2/1950 | Milton | 111/85 |
| 2,554,061 | 5/1951 | Sandberg | 111/85 |
| 2,704,524 | 3/1955 | McIntyre | 111/85 X |
| 3,611,956 | 10/1971 | Moore et al. | 111/87 X |
| 3,626,877 | 12/1971 | Hansen et al. | 111/85 |
| 3,715,057 | 2/1973 | Becker | 111/77 X |
| 3,749,035 | 7/1973 | Cayton et al. | 111/62 X |
| 3,841,245 | 10/1974 | Tye | 111/85 |
| 3,960,219 | 6/1976 | van der Lely | 172/39 |

FOREIGN PATENT DOCUMENTS 2,310,805  3/1973  Fed. Rep. of Germany ............. 111/86

*Primary Examiner*—Edgar S. Burr
*Assistant Examiner*—James R. Feyrer
*Attorney, Agent, or Firm*—Kinney, Lange, Westman & Fairbairn

[57] ABSTRACT

A depth control for grain drills, planters or the like utilizing a press wheel which can be adjusted to control the depth of each individual furrow opener to insure uniform depth of planting across the width of wide machines presently in use.

3 Claims, 3 Drawing Figures

PRESS WHEEL DEPTH CONTROL FOR GRAIN DRILL FURROW OPENERS

BACKGROUND OF THE INVENTION

1. Field of the Invention

The present invention relates to press wheel type seeders utilizing the press wheel to provide individual depth control for each of the furrow openers.

2. Prior Art

In the prior art various depth control means have been utilized for controlling the depth of furrow openers in planters and seeders.

An individual depth control is shown in U.S. Pat. No. 2,554,061 issued to Sandberg. In this particular device disc furrow openers are utilized and are mounted onto a support arm. A link has a press wheel at its rear end and is pivotally mounted to the same support arm at its leading end. A threaded adjustment is provided for regulating the relationship between the link and the support arm for the furrow opener. The adjustment provides control of the height relationship between the furrow opener and the press wheel. However the range of adjustment is limited, and the overhead clearance is also limited with the device shown in this patent because the link extends over the furrow opener.

U.S. Pat. No. 2,496,885 also shows a device having a covering wheel for a planter that is spring loaded for exerting pressure for covering seed. The device is used primarily for sugar beet planting and the covering wheel does not accurately control the depth of the furrow openers, but rather resiliently packs the ground around the planted seeds.

Another press wheel device is shown in U.S. Pat. No. 3,509,947.

U.S. Pat. No. 2,685,243 also shows a depth wheel for seed planters where the wheel is independently mounted on the frame and adjustable to control the depth of the planter.

In most grain drills several press wheels are mounted onto a common shaft or frame so that several press wheels move as a gang or unit. This tends to cause irregular packing, and also makes depth control difficult.

SUMMARY OF THE INVENTION

The present invention relates to the individual control of the depth of a furrow opener for a grain drill by adjusting a pivotally mounted press wheel that trails the furrow opener. The pivot of the mounting for each press wheel is behind the respective furrow opener so that the entire device can be quite compact, and yet will have a wide range of depth control.

The device is easy to adjust, easy to make, and provides a stable, rugged, depth control for individual control of furrow openers in a grain drill. Individual control permits the drill to be operated at a wide variety of depths in a wide variety of different soil conditions.

The press wheels are also mounted to permit the furrow vent to lift over a rock or the like and the press wheel will continue to ride on the ground to tend to continue to cover the seed without jumps or skips of a large number of wheels.

DESCRIPTION OF THE PREFERRED EMBODIMENT

Figure 2:
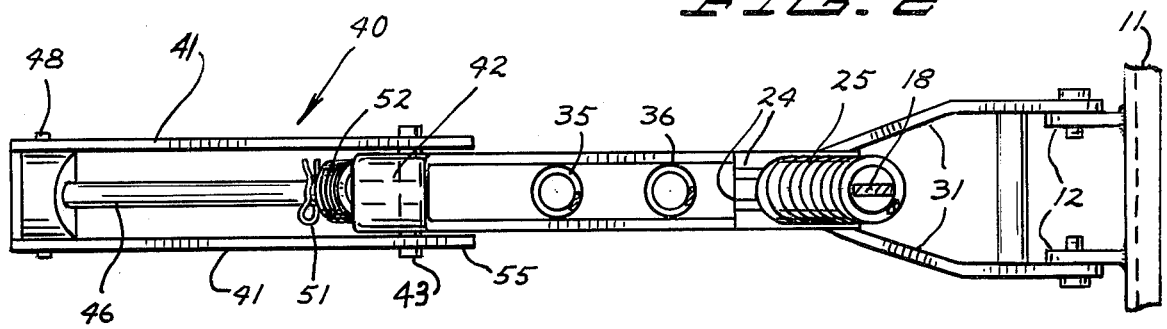
FIG. 2 is a top plan view of the device of FIG. 1.
Figure 1:
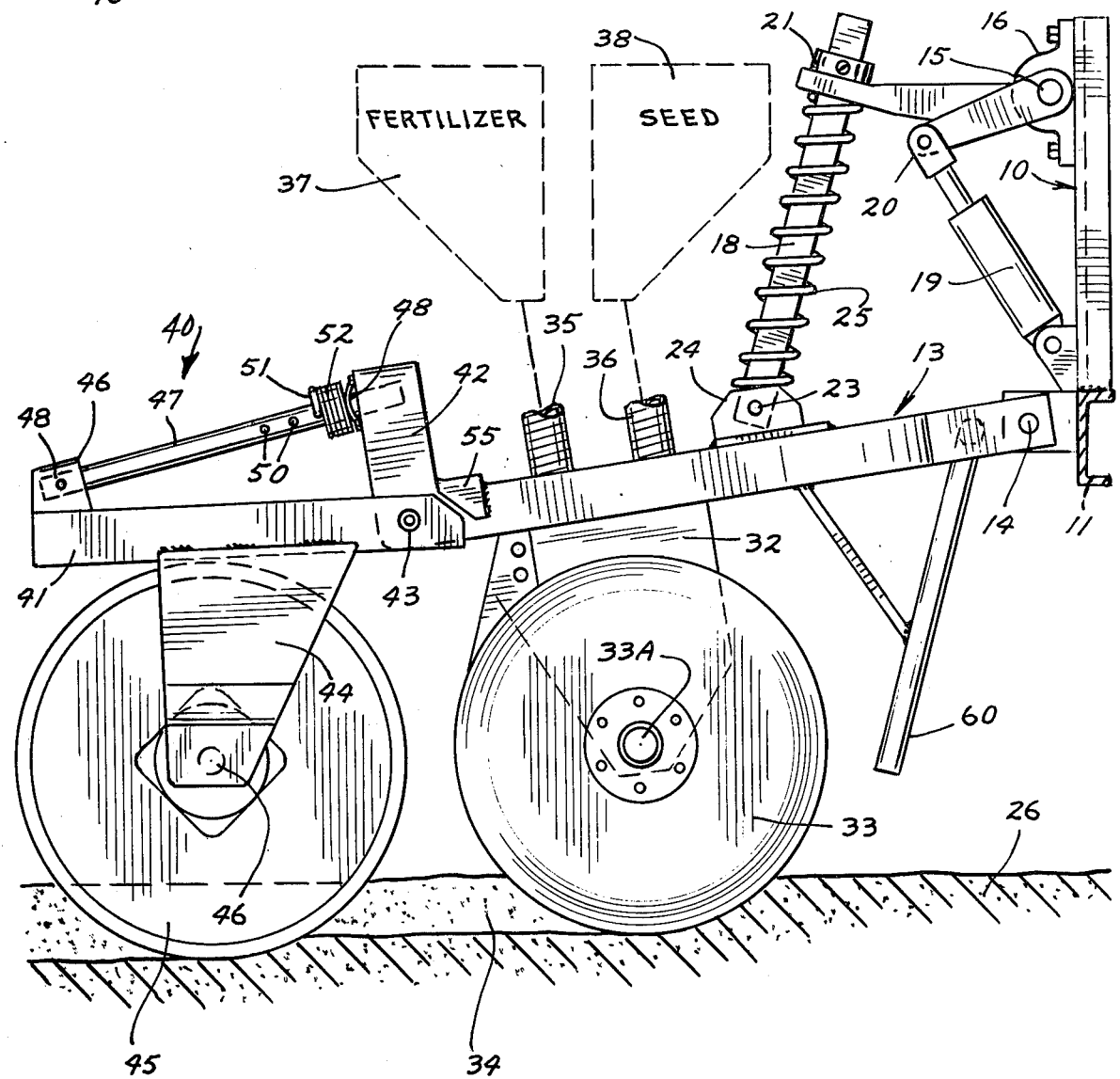
FIG. 1 is a side elevational view of a depth control device made according to the present invention schematically showing controls for the device.

Referring to the drawings, a grain drill frame which is indicated only schematically at 10 is supported on the ground on suitable wheels (not shown) in a normal manner and comprises a prime mover when being pulled by a tractor or other motive power, and has a front support frame member 11 that extends across the width of the drill. The support 11 has suitable ears 12 attached thereto to which a furrow opener-press wheel assembly indicated generally at 13 is pivotally mounted. The pivot axis is indicated at 14, and the assembly 13 may pivot up and down about this pivot axis. The pivoting of the assembly 13 is controlled, also as shown schematically only through the use of a rock shaft assembly 15 that is mounted onto suitable supports 16 with respect to the frame 10, and has an arm 17 that extends over and slidably receives a link 18. The link 18 has a collar 21 pinned thereto above the arm 17, so that when the arm 17 is pivoted in counterclockwise direction as shown in FIG. 1 through the use of a hydraulic cylinder assembly 19 acting on a lever 20 also attached to the rock shaft 15, the arm 17 will be pivoted up, lifting the link 18 through the collar 21. The link 18 is also pivotally mounted as at 23 to a pair of ears 24 that are attached to the assembly 13, so that movement of link 18 causes the assembly 13 to be pivoted about the pivot 14.

A compression coil spring 25 surrounds the link 18 between collar 21 and ears 24. When the cylinder 19 is retracted lever 20 will rotate in counterclockwise direction, also rotating shaft 15 and the arm 17 in counterclockwise direction and exerting a downward force against the spring 25. This spring force is exerted against the assembly 13 thus tending to force the assembly 13 toward the ground, which is indicated generally at 26.

This spring loading-lifting arrangement is conventional in grain drills, to provide a spring bias load to load the furrow opener assembly 13 into the ground. Suitable rock shafts of any style, and any style frame can be utilized with the present device. The frame illustrated is a schematic representation for purposes of explanation only and is not intended to represent the exact mechanical construction used in grain drills.

The furrow opener assembly illustrated at 13 includes a first frame member 30 that is defined by a pair of straps 31,31 that extend in fore and aft direction and are laterally spaced apart at their forward ends and which are attached to ears 12. A housing 32 is positioned between the straps 31 adjacent the rear portions thereof. The housing 32 extends downwardly as shown, and a pair of disc type furrow openers 33 are rotatably mounted on the lower end thereof in the normal manner. These disc furrow openers generally are positioned so that they are closer together in the forward edge thereof to open a furrow indicated generally at 34 for seed. The housing 32 has suitable tubes 35 and 36 which lead from sources of fertilizer 37 and seed 38 shown only schematically. Conventional metering mechanisms feed fertilizer and seed into the housing 32 and thus down into the furrow 34.

For covering over the furrow 34 and packing and covering the seed, a press wheel assembly illustrated generally at 40 is utilized. The press wheel assembly 40 also regulates the depth of the lower edges of the furrow opener discs 33. The press wheel assembly, as shown, comprises a pair of frame straps 41,41 which straddle the frame members 31,31 at the rear portions of the frame 30 and to the rear of the furrow openers. The members 41,41 may be held together with suitable cross members.

It can be seen that at the rear portions of the frame 30, there is an upright generally inverted U shaped support 42 that is fixed to the frame 30, and the strap frame members 41,41 are on the outside of this support 42.

A suitable pivot bolt 43 extends through the rear portions of the frame 30, and through the straps 41,41 to pivotally mount the press wheel assembly 40 about a horizontal axis, which is to the rear of the disc openers 33. It should be noted that the disc openers 33 rotate about an axis 33A.

The press wheel assembly 40 includes a pair of depending straps 44 that are fixed to the frame straps 41,41, and a press wheel member 45 is rotatably mounted about an axis 46 between these straps 44. At the rear portion of the straps 41,41 there is a support 46 that pivotally mounts an elongated rod or tube member 47 as at 48. The rod or tube 47 extends forwardly toward the support 42, and slidably passes through the center opening of a washer 48 that is fixed to the support 42 at the rear side. The washer 48 is curved or non-planar as shown. The rod 47 has a plurality of cross holes 50 therein through which a pin 51 can extend. The pin 51 is used for a stop member, and may be of the common spring loaded "hair pin" construction widely used in farm machinery. A plurality of individual disc washers 52 can be placed over the rod to between the pin 51 and the fixed washer 48. The use of washers 52 and movable pin 51 permit adjustment so that the stopped position of the press wheel assembly as it pivots upwardly about the axis of pivot 43 can be adjusted.

Also, as shown in FIG. 1 a pair of mechanical stop members 55 are mounted, one on each side of the frame 30, to prevent the press wheel assembly from dropping way downwardly about the pivot 43 to an undesired position when the furrow openers 33 are lifted. The stops engage the straps 41,41 to prevent excessive pivoting. However, when working, if the furrow openers ride over a rock or hard spot of ground, the press wheel will remain on the ground because the rod 47 will slide rearwardly in washer 48 for a short distance.

Figure 3:
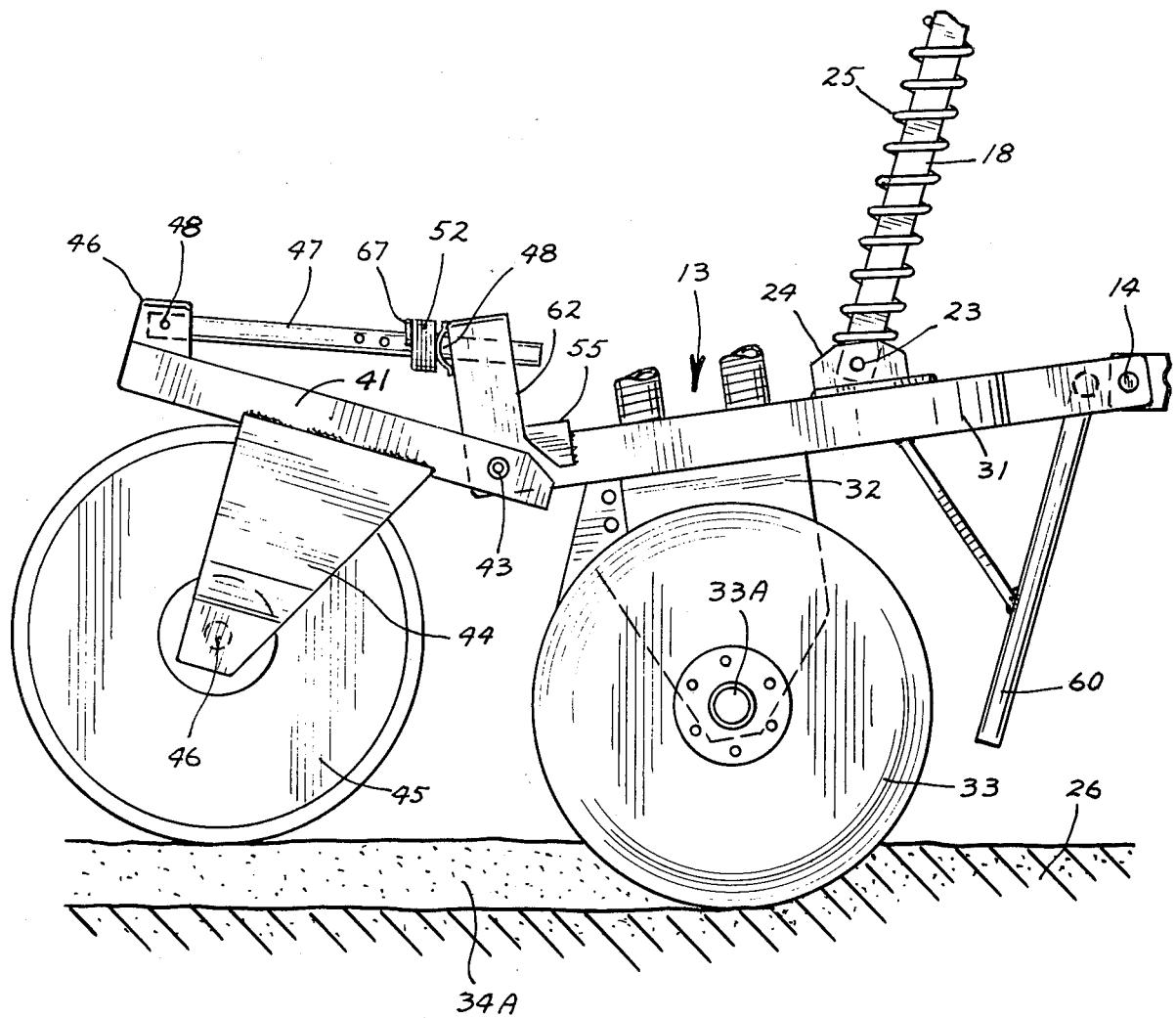
FIG. 3 is a view of the device of FIG. 1 with the depth control in a second position to show the range of control.

Because the pin 43 is to the rear of the disc openers 33, the telescoping rod 47 which passes through the washer 48 on the support 42 can be changed in location to provide a substantial variation in plane of travel of the press wheel member 45. As shown in FIG. 3, when the pin 51 is moved into a hole 50 that is closer to the pivot 48, the press wheel 45 will pivot upwardly as the assembly 13 is forced toward the ground. The discs 33 enter the ground to a depth that is lower than the lower edge of the press wheel. The press wheel will run along the ground, and pack and cover seed dropped in the opened furrow and also control the depth of the discs.

FIGS. 1 and 3 show two different depths of control in two different types of soil or operating conditions. In FIG. 1, the press wheel is set at a position where the lower edge of the press wheel 45 is actually below the lower edge of the disc 33, and in soft ground the discs 33 will still form a furrow 34 while the press wheel 45 will sink into the ground and cover the seed as it moves along. Not much spring pressure is required in this arrangement or condition and the device exerting spring force will be adjusted to provide only light pressure.

However, in hard ground, such as for example that which is encountered when the ground is relatively dry, and minimum tillage practices are being carried out, the press wheel 45 can be set so that it rides substantially on top of the ground to cover the seed, and yet the discs 33 can be forced downwardly by increased pressure on the spring 25 to a position where the openers will form a furrow 34A which is sufficiently deep to properly plant the seed.

The increased spring pressure can be obtained through the spring linkage which is shown only schematically. If hydraulic cylinders are used, as shown schematically, the stopped position of the cylinder can be suitably adjusted.

A depending rod like projection 60 is fixed to the frame 30 and is positioned ahead of the discs 33. The rod 60 aligns with the path of the discs. The rod 60 tends to clear trash, rocks, and other material or movable obstruction out of the way of the disc openers. This is particularly important when minimum tillage (unplowed) ground is being seeded.

In normal practice several furrow openers are used side by side in a grain drill assembly. Each of the furrow openers 33 for each of the individual rows of seed is controlled individually as to depth, so that hard spots or rocks in one of the seed paths will not cause the other furrow openers in a grain drill assembly to jump or skip. Likewise, irregularities in the ground itself are not a factor and the individual press wheels 45 will properly regulate the depth of their associated furrow openers to control the depth of the furrow for seed planting precisely.

In most drills, it is to be understood that the spring load control, such as rock shaft 15, would cause force to be exerted on a plurality of furrow openers through a plurality of laterally spaced arms 17.

What is claimed is:

1. In combination, a depth control apparatus for controlling the depth of furrow openers used for planting seeds or the like comprising a first frame adapted to be pivotally mounted to a prime mover about a generally horizontal axis at a leading end thereof; a furrow opener for opening a path for seed mounted on said first frame member; a second frame member pivotally mounted about a generally horizontal axis to said first frame member to the rear of said furrow opener; a ground engaging press wheel rotatably mounted on said second frame member and positioned to follow in the path of said furrow opener mounted on said first frame member, said wheel being positioned closely adjacent the rear portions of said furrow opener; adjustable means to limit the upward pivotal movement of said wheel mounted on said second frame member relative to said first frame member about the pivot between the first and second frame members to retain said wheel in position engaging the ground as the furrow opener enters the ground to control the depth of said furrow opener, said adjustable means to limit the upward movement comprising an elongated member pivotally mounted on said second frame member to the rear of the rotational axis of said wheel, a fixed upright support mounted on said first frame member including means spaced above said first frame to slidably receive said elongated member in said upright support member to permit relative sliding between the elongated member and upright support as the second frame member pivots relative to the first frame member, and means to limit the travel of said elongated member relative to the support member to limit the pivotal movement of said second frame member upwardly relative to said first frame member comprising a series of apertures in said elongated member, a pin removably mounted in one of said apertures, and means on said upright support engageable by said pin to form a positive upward stop as the second frame member pivots upwardly; and second stop means separate from said elongated member cooperating between said first and second frame members to prevent said second frame member from pivoting downwardly relative to said first frame member more than a desired amount while permitting unrestrained upward movement of the second frame member.

2. The combination as specified in claim 1 and spring means, means to exert a pressure on said spring means to urge said first frame member toward the ground under a biasing force.

3. The combination as specified in claim 1 and a fixed depending rod mounted on said first frame member ahead of said furrow opener and adapted to clear trash out of the path of said furrow opener.

* * * * *